(12) United States Patent
Hemani et al.

(10) Patent No.: US 10,019,848 B2
(45) Date of Patent: Jul. 10, 2018

(54) EDGE PRESERVING COLOR SMOOTHING OF 3D MODELS

(71) Applicant: Adobe Systems Incorporated, San Jose, CA (US)

(72) Inventors: Mayur Hemani, Delhi (IN); Kedar Vijay Bodas, Maharashtra (IN)

(73) Assignee: Adobe Systems Incorporated, San Jose, CA (US)

( * ) Notice: Subject to any disclaimer, the term of this patent is extended or adjusted under 35 U.S.C. 154(b) by 182 days.

(21) Appl. No.: 14/814,979

(22) Filed: Jul. 31, 2015

(65) Prior Publication Data

US 2017/0032580 A1    Feb. 2, 2017

(51) Int. Cl.
*G06T 19/20*    (2011.01)

(52) U.S. Cl.
CPC ...... *G06T 19/20* (2013.01); *G06T 2219/2012* (2013.01)

(58) Field of Classification Search
CPC . G06T 5/002; G06T 5/20; G06T 2207/20012; G06T 19/20; G06T 2207/20182; G06T 2207/20192; G06T 2207/20228; G06T 2219/2012; G06T 2200/12; G06T 2207/20028; G06T 5/003; G06K 9/6215; G06K 15/1878; G06K 9/40; G06K 9/4671; G06K 9/6202; G06K 9/741
See application file for complete search history.

(56) References Cited

U.S. PATENT DOCUMENTS

| | | |
|---|---|---|
| 7,760,911 B2 | 7/2010 | Xiao et al. |
| 7,889,950 B2 | 2/2011 | Milanfar et al. |
| 8,406,548 B2 | 3/2013 | Ali et al. |
| 8,478,064 B2 | 7/2013 | Kass |
| 8,731,320 B2 | 5/2014 | Leitao |
| 8,823,745 B2 | 9/2014 | Francois et al. |

(Continued)

FOREIGN PATENT DOCUMENTS

WO    2014/206503 A1    12/2014

OTHER PUBLICATIONS

Joshi, et al., "Image deblurring and denoising using color priors," downloaded from <http://research.microsoft.com/pubs/80496/Joshi-CVPR09.pdf> on Mar. 9, 2015 (© 2009), 8 pages.

*Primary Examiner* — Jeffrey Chow
(74) *Attorney, Agent, or Firm* — Finch & Maloney PLLC

(57) ABSTRACT

Techniques are disclosed for noise reduction and color smoothing of scanned 3D models for 3D printing. An anisotropic box kernel variant of a bilateral filter is applied to each vertex of a 3D mesh model, where the vertices contain color information. With bilateral filtering, the color at a given vertex is, under certain conditions, replaced by a Gaussian weighted average of colors of neighboring vertices. The weighting is a function of a geometric distance between vertices. The direction of traversal is limited towards neighboring vertices where a color mismatch is a color difference larger than the threshold value. The color of a neighboring vertex is rejected if the vertex normals differ from by a large angle. The weighted average of colors of the neighboring vertices is also rejected if the given vertex lies in a region where the color match/mismatch ratio is low at the end of the traversal.

20 Claims, 7 Drawing Sheets
(1 of 7 Drawing Sheet(s) Filed in Color)

(56) References Cited

U.S. PATENT DOCUMENTS

2012/0309520 A1 12/2012 Evertt et al.
2015/0324998 A1* 11/2015 Song .................. G06T 3/40
                                                382/171

* cited by examiner

EDGE PRESERVING COLOR SMOOTHING OF 3D MODELS

FIELD OF THE DISCLOSURE

This disclosure relates to the field of image processing, and more particularly, to techniques for noise reduction and color smoothing of scanned three-dimensional (3D) models for 3D printing.

BACKGROUND

Recently, three-dimensional cameras that produce image data with both color and depth information at the pixel level have proliferated. Such cameras include, for example, Microsoft Kinect and 3D Systems Sense. The depth represents the distance between the camera and the surface of an object in the scanned scene. A 3D mesh model of the object can be constructed from the image data, and provided to a 3D printer for printing a 3D copy of the object. The 3D mesh model defines faces and vertices. Vertices define the intersections of adjacent faces. Colors at the vertices can be defined by a color value, such as a red-green-blue (RGB) color value or other suitable color value. The colors on the faces of the 3D mesh model can be computed from the vertex colors. However, because the computationally intensive spatial alignment of the color and depth information detected by the camera sensors is performed in real-time, such 3D cameras are typically only capable of producing low resolution images, which can introduce undesirable noise into the image data, particularly in scenes with low, diffused lighting. When a 3D mesh model representing noisy 3D image data is used in a 3D printing application, the noise in the image data translates into smudges on the 3D mesh model. Furthermore, 3D printers generally do not produce high-fidelity colors at this time. Existing post-processing techniques for removing the noise from image data is either highly manual or involve compromising details, such as edges. Thus, there is a need for improved noise reduction and color smoothing techniques for scanned 3D models that produce acceptable results for a variety of image processing applications.

BRIEF DESCRIPTION OF THE DRAWINGS

The file of this patent contains at least one drawing/photograph executed in color. Copies of this patent with color drawing(s)/photograph(s) will be provided by the Office upon request and payment of the necessary fee.

The accompanying drawings are not intended to be drawn to scale. In the drawings, each identical or nearly identical component that is illustrated in various figures is represented by a like numeral.

DETAILED DESCRIPTION

Figure 1:
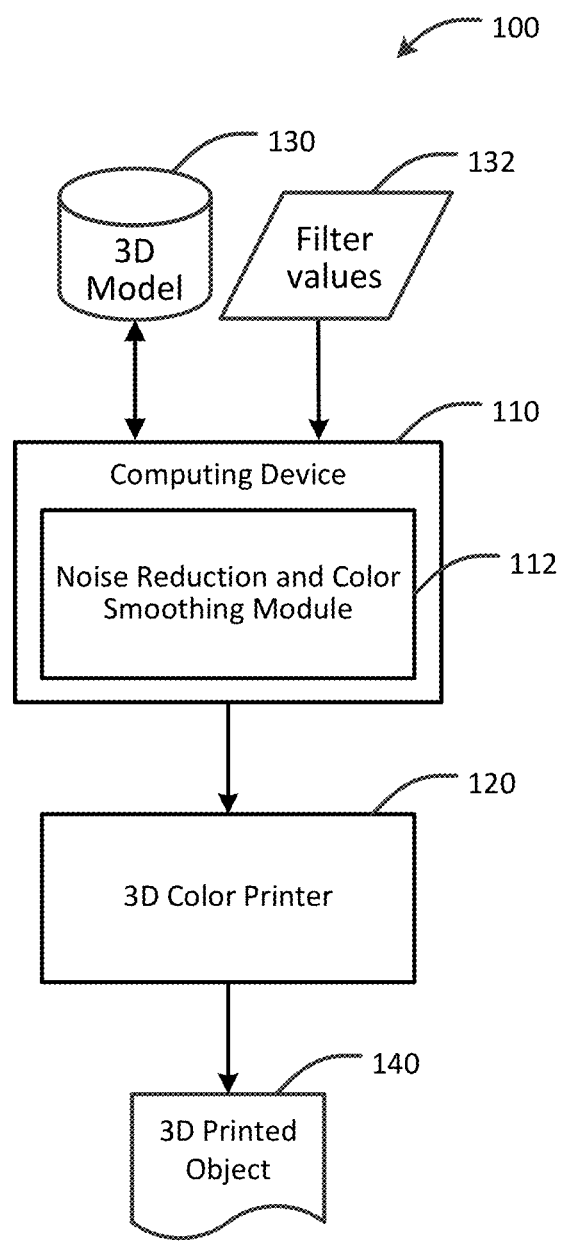
FIG. 1 is an example system for noise reduction and color smoothing of scanned 3D models for 3D printing, in accordance with an embodiment of the present disclosure.

Three-dimensional (3D) printing is a process of forming a three-dimensional object in which successive layers of material are laid down under computer control. The computer controls the deposition of the material based on a 3D model (sometimes called a 3D mesh model). The 3D model can be generated from an image having color and depth information, and undergoes post-processing after the 3D model is generated and prior to printing. A significant portion of the post-processing is related to color improvement. For instance, undesirable color variation in the 3D model results from the low level of exposure and the corresponding noise from sensors used to produce 3D scans of physical objects. In situations where the physical object includes a fabric material, color variation results from the manner in which the fabric reflects some light and diffuses other light. During post-processing, the colors are smoothed to reduce such variations. Some existing solutions to color smoothing include blurring the entire 3D model using a Gaussian function, fully unwrapping the 3D model onto a common plane, manually selecting parts of the 3D model to be blurred, and manually altering colors on the 3D model. Gaussian blurring on 3D model vertex colors reduces noise, but considerably comprises the edges in the colors, and therefore details of the object are lost. Full unwrapping of the 3D model is extremely difficult for scanned 3D models, especially human models, and therefore these models must be operated upon by manually selecting portions of the model to de-noise. Another noise reduction technique includes processing two-dimensional (2D) projections of the 3D model and then re-applying the results back to the 3D model. However, such techniques are time-consuming, labor intensive, and tedious to use.

To this end, and in accordance with an embodiment of the present disclosure, a technique is disclosed for noise reduction and color smoothing of scanned 3D models for 3D printing. In one such embodiment, the technique includes applying an anisotropic box kernel variant of a bilateral filter to each vertex of a 3D mesh model, where the vertices contain color information, and conditionally adjusting the colors of each vertex based on the output of the filter and the color(s) of one or more neighboring vertices. Bilateral filtering is an image noise reduction technique that also preserves the edges of an object. With bilateral filtering, the color at a given vertex is, under certain conditions, adjusted by a Gaussian weighted average of colors of neighboring vertices. The conditions for adjusting the vertex colors are a function of inputs to the filter. These inputs include the 3D model and parameters for the maximum radius and a threshold for the color difference between neighboring vertices. The weighting is a function of a geometric (e.g., Euclidean) distance between the given vertex and the neighboring vertex. In this case, the bilateral filter employs a variable kernel radius, which defines the distance of traversal from a given vertex as limited by the maximum radius parameter, and changes as a function of the geometry and color of neighboring vertices. The direction of traversal is limited towards neighboring vertices within the kernel radius that provide a good ratio of color matches between neighboring vertices to color mismatches, where a color mismatch is a color difference larger than the color difference threshold value parameter. Additionally, edges are preserved by rejecting the color of a neighboring vertex if the normal of the neighboring vertex differs from the normal of the given vertex by a large angle (e.g., where the inverse cosine of the angle is less than about 0.1), which may indicate a relief feature on the surface of the object. The weighted average of colors of the neighboring vertices is also rejected if the given vertex lies in a high-frequency detail region, which is a region where the color match/mismatch ratio is low at the end of the traversal. The filter is applied to each vertex in the 3D model, and the color of each vertex is maintained or adjusted accordingly. Numerous configurations and variations will be apparent in light of this disclosure.

By filtering noise using techniques as variously disclosed herein, color smoothing can be advantageously applied directly to the 3D model without unwrapping the model or using any manual input. Furthermore, vertices in the 3D model having very distinct normals with respect to the subject vertex are pruned away and disregarded because they lie on the edge of a relief (surface prominence) feature on the 3D mesh, thereby preserving edge details in the image during noise reduction. The anisotropic property of this particular technique further encourages greater searches of the 3D mesh model in the directions of vertices having similar colors to the subject vertex, which reduces noise-induced smudges on the 3D mesh model.

As used in this disclosure, the term "3D mesh model" or "3D model" refers to a collection of vertices, edges and faces that define the shape of a polyhedral object in 3D computer modeling. As used in this disclosure, the term "vertex" refers to a coordinate position in the model, and may include other information, such as color, normal vector and texture coordinates that correspond to the modeled object.

As used in this disclosure, the term "normal" as applied to a vertex of a polyhedron generally refers to a directional vector associated with the vertex that represents the true geometric normal to the surface. The normal may, for example, be an average of the surface normals of the faces that contain the vertex.

Example System

FIG. 1 is an example system 100 for noise reduction and color smoothing of scanned 3D models for 3D printing, in accordance with an embodiment of the present disclosure. The system 100 includes a computing device 110 configured to execute a noise reduction and color smoothing module 112. In some embodiments, the system 100 includes a 3D color printer 120 operatively connected to the computing device 110. In still other embodiments, the noise reduction and color smoothing module 112 may be integrated into the input pre-print processing block or front-end of the 3D color printer 120. For example, the pre-print processing block or printer front-end may be implemented as an algorithm in a 3D image editing application, as part of a separate printer device driver that processes output of an application on the computing device 110 before the output is sent to the 3D color printer 120, or integrated into the processor of a 3D printer. The noise reduction and color smoothing module 112 is configured to receive a 3D model 130 and filter values 132 for filtering the 3D model 130. The 3D model may, for example, be stored on a computer in file formats such as PLY (Stanford Polygon format), and OBJ (Wavefront object format), among others. The 3D color printer allows the computing device 110 to generate a 3D object from the 3D model. The filter values 132 may include, for example, a threshold value specifying an amount of difference between two colors, a threshold value specifying an angle between two surface normals, or both. The filter values 132 can be used to determine whether or not to make color adjustments to individual vertices in the 3D model, such as variously described with respect to FIGS. 2, 3, 4A and 4B.

In accordance with an embodiment of the present disclosure, the noise reduction and color smoothing module 112 is further configured to apply a box kernel bilateral filter to the 3D model 130 using the filter values 132 to produce a noise reduced and color smoothed version of the 3D model 130 while still maintaining prominent edges and details in the colors of the model, such as variously described with respect to FIGS. 2, 3, 4A and 4B. The computing device 110 is configured to control the 3D color printer 120 using the 3D model 130 to produce a 3D printed object 140.

Example Methodology

Figure 2:
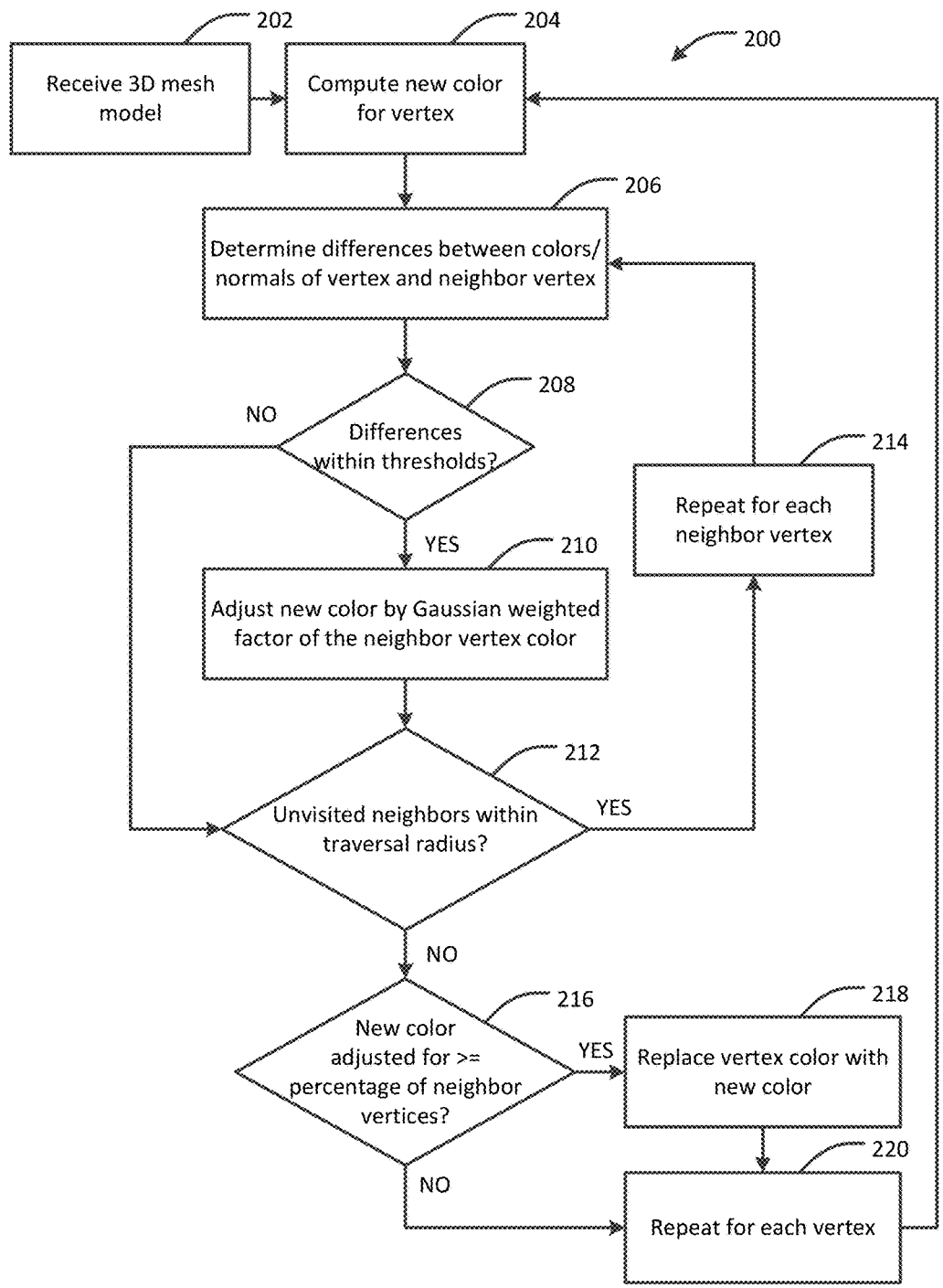
FIG. 2 shows a flow diagram of an example methodology for noise reduction and color smoothing of scanned 3D models for 3D printing, in accordance with an embodiment of the present disclosure.

FIG. 2 shows a flow diagram of an example methodology 200 for noise reduction and color smoothing of scanned 3D models for 3D printing, in accordance with an embodiment of the present disclosure. The methodology 200 may, for example, be implemented by the noise reduction and color smoothing module 112 of FIG. 1. A 3D mesh model is received 202 and used to compute 204 a new color value for a given vertex in the 3D model. The new color value is initialized to a fraction of the original color of the given vertex. The fraction is the Gaussian function computed at the given vertex with a variance $\sigma^2$. For a neighboring vertex, the color and normal differences between the given vertex and the neighboring vertex are determined 206. In 3D meshes with per-vertex colors, neighborhoods are defined by edge connectivity as against spatial adjacency for 2D images. A radius value of the bilateral filter defines a cut-off Euclidean distance for the vertex neighborhood.

Figure 3:
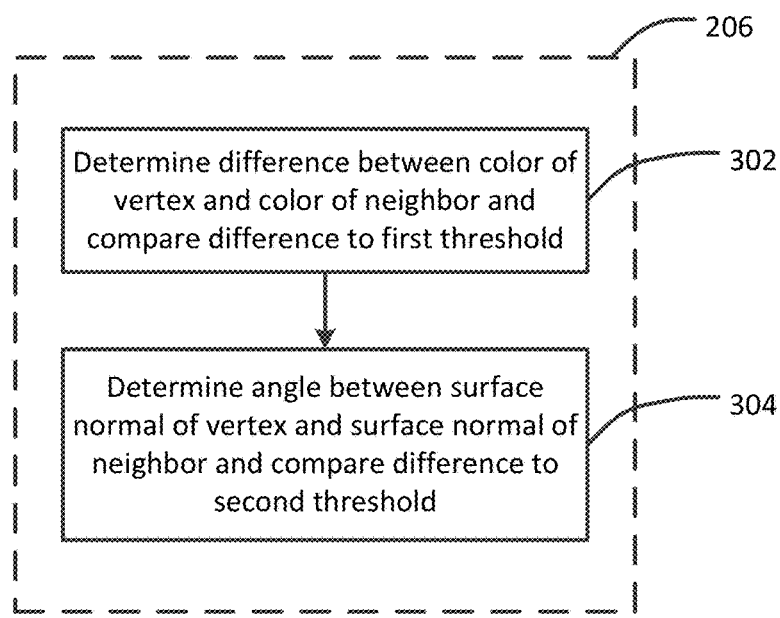
FIG. 3 shows a flow diagram of a portion of the method of FIG. 2, in accordance with an embodiment of the present disclosure.

FIG. 3 shows a flow diagram of a portion of the method 200 of FIG. 2, in further detail and in accordance with an embodiment of the present disclosure. The determination 206 of the color and normal differences includes determining 302 a difference between the color of the given vertex and the color of a neighboring vertex and comparing the difference against a first threshold value. In some cases, large color differences of neighboring vertices (e.g., larger than the first threshold value) potentially represent the edges of different objects or surfaces in the scene (e.g., the edge of a bright surface adjacent to the edge of a dark surface). Therefore, in such cases, the colors are not smoothed to prevent undesirable blurring of the 3D model during noise reduction. In contrast, color differences that are relatively small (e.g., less than or equal to the first threshold value) are likely to represent the same object or surface, where color smoothing is desirable to reduce noise. The determination 206 further includes determining 304 an angle between the surface normals of the respective vertices and comparing the difference against a second threshold value. In some cases, large angles between the normals of neighboring vertices (e.g., larger than the second threshold value) potentially represent edges or large changes in the surface relief. Therefore, in such cases, the colors are not smoothed to prevent undesirable blurring of the 3D model during noise reduction. In contrast, relatively small angles between the normals (e.g., less than or equal to the second threshold value) are likely to represent relatively smooth or continuous objects or surfaces, where color smoothing is desirable to reduce noise. As such, either or both of the color threshold value and the normal threshold value can be used in the filter to reduce undesirable blurring or smoothing at the edges of objects, surfaces or relief features, thereby preserving details in the 3D model. For example, the color threshold value may be $\tau_c$ (a value between 0 and 1) and the normal threshold value may be 0.1 or another suitable threshold value (e.g., the filter values 132 of FIG. 1).

Referring again to FIG. 2, if 208 both the color and normal differences are less than or equal to the respective threshold values, the new color value is adjusted 210 by a Gaussian weighted factor of the neighbor vertex color and stored; otherwise, the new color value remains unchanged from the previously adjusted value, or the initial value if no adjustments have yet been made. If there are any unvisited neighboring vertices within the traversal radius 212, the method 200 repeats 214 for each neighboring vertex. Once all such neighboring vertices have been processed, a determination 216 is made with respect to the number of neighboring vertices for which the new color value was adjusted. If the new color value was adjusted for at least a certain percentage of all visited neighboring vertices (e.g., 60%), then the color of the given vertex is replaced 218 by the adjusted new color value. In some embodiments, the percentage is fixed (e.g., 60%), while in some embodiments the percentage is user-selectable. The percentage may, for example, be increased or decreased to provide different results for a given 3D model (e.g., to increase or decrease the amount of color smoothing as desired by the user), although it will be understood that the techniques variously described herein do not require user selection of the percentage. Otherwise, the color of the given vertex is not changed. The method 200 repeats 220 for each vertex in the 3D model to produce a noise reduced and color smoothed version of the 3D model, which can then be used by a 3D printer to generate a 3D printed object.

Example Noise Reduction and Color Smoothing Algorithm

Figure 4A:
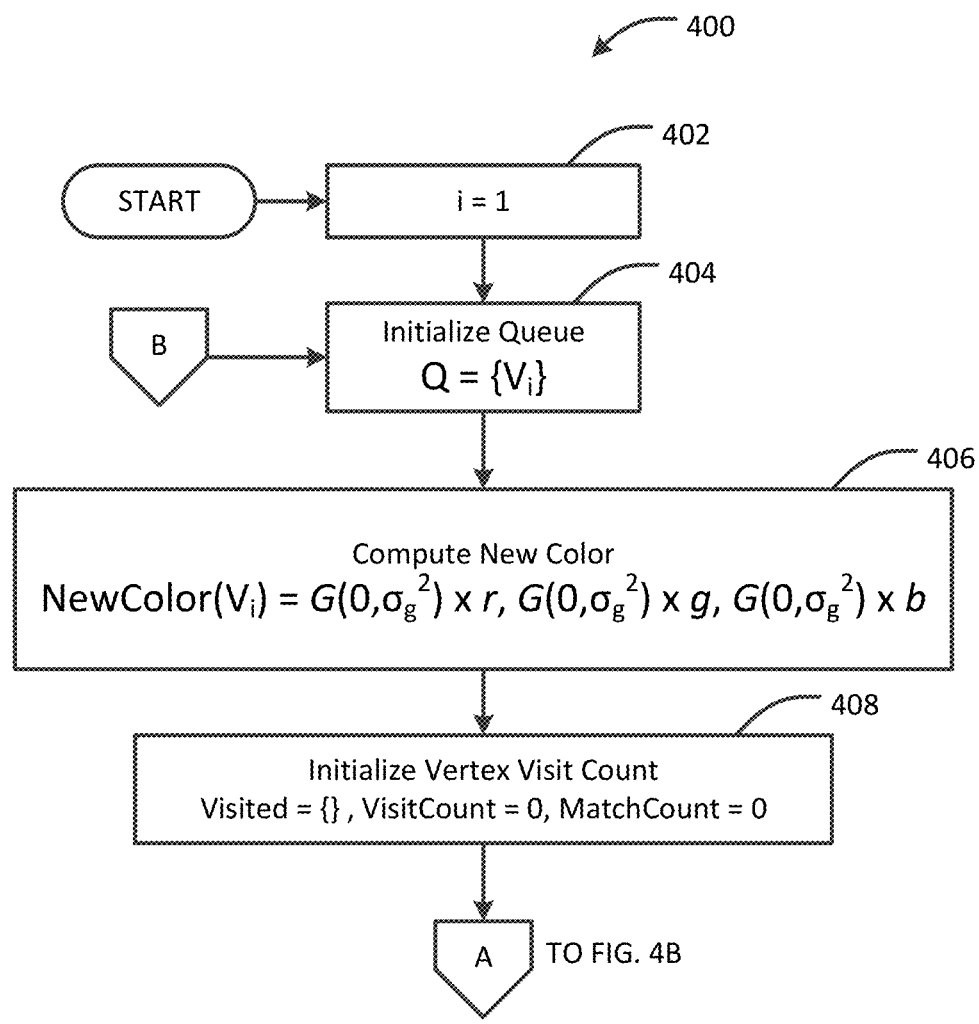
FIGS. 4A and 4B show a flow diagram of an algorithm for noise reduction and color smoothing of scanned 3D models for 3D printing, in accordance with an embodiment of the present disclosure.
Figure 4B:
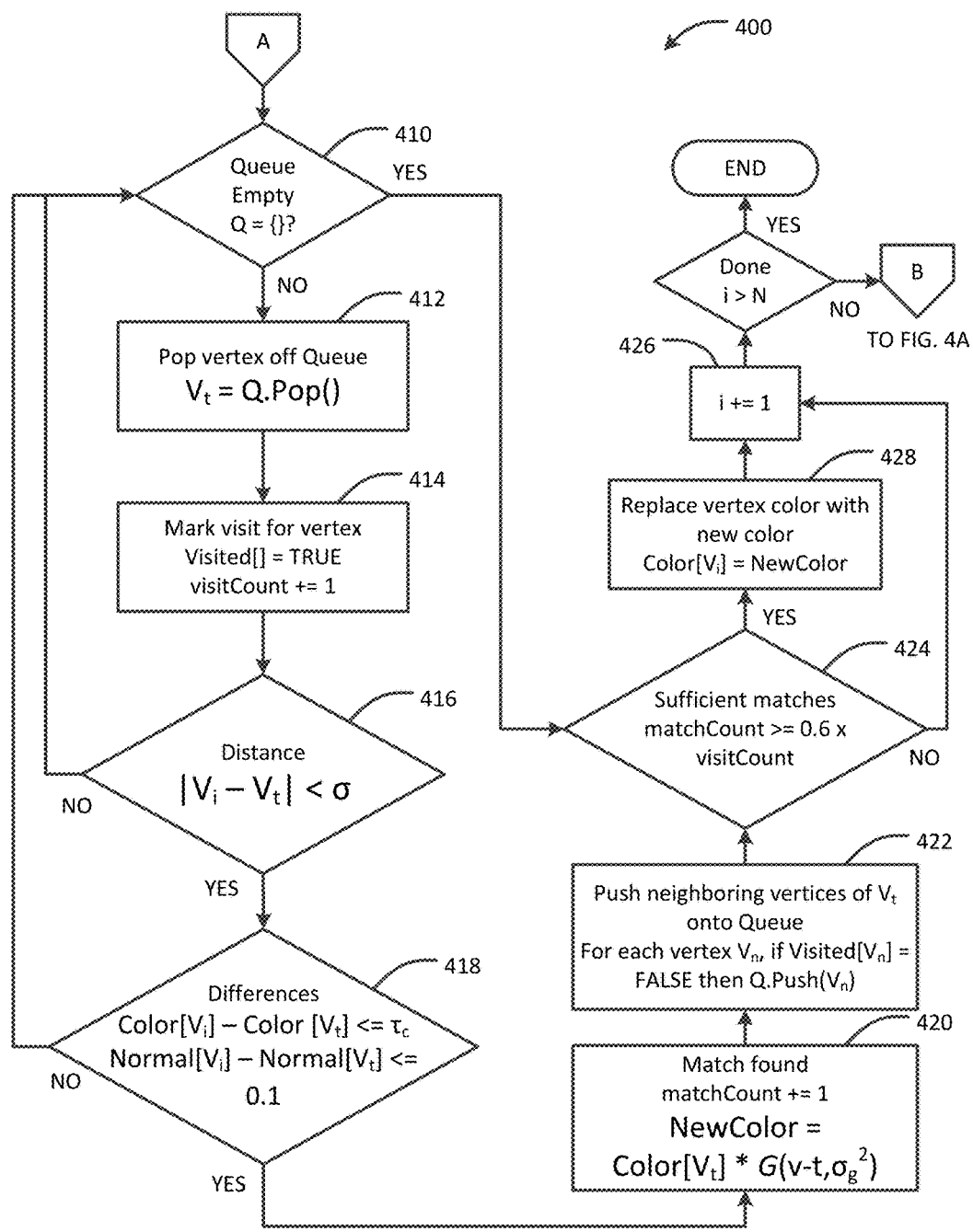

FIGS. 4A and 4B show a flow diagram of an algorithm 400 for noise reduction and color smoothing of scanned 3D models for 3D printing, in accordance with an embodiment of the present disclosure. The algorithm 400 may, for example, be implemented by the noise reduction and color smoothing module 112 of FIG. 1. Referring first to FIG. 4A, initially a variable i is set at 402 to one and a queue is initialized at 404 to contain all vertices of a 3D model (e.g., the 3D model 130 of FIG. 1). Next, a new color is computed at 406 for a given one of the vertices in the queue. The new color is a fraction of the color at the vertex. The fraction is the Gaussian function computed at the given vertex with a variance $\sigma^2$. For example, the new color for vertex $V_i$ may be initialized according to the following equation:

$$\text{NewColor}(V_i) = G(0, \sigma_g^2) \times r, G(0, \sigma_g^2) \times g, G(0, \sigma_g^2) \times b \quad (1)$$

In equation (1), r represents red, g represents green, b represents blue, and $\sigma_g$ is the maximum radius of traversal.

Next, several variables are initialized at 408. As described in further detail below, these variables track which neighboring vertices have been traversed (visited), the total number of vertices visited, and the number of neighboring vertices for which there is an acceptable difference between colors and normals as compared between the given vertex and a neighboring vertex.

Referring next to FIG. 4B, the queue is checked at 410 to determine whether the queue is empty. If the queue is not empty, one of the neighboring vertices is retrieved, or popped at 412, from the queue. The neighboring vertex is marked at 414 as visited (e.g., using the variables), and the visit count is incremented by one. If at 416 the geometric distance between the given vertex and the neighboring vertex is less than the traversal radius $\sigma_g$, then the color and normal differences between the respective vertices are compared against threshold values. If at 418 both the color and normal differences are less than or equal to the respective threshold values (e.g., color match is within $\tau_c$ and the inverse cosine of the angle between the normals is less than about 0.1), the new color is adjusted at 420 by a Gaussian weighted factor of the neighbor vertex color and the match count is incremented by one; otherwise, the new color remains unchanged from the previously adjusted value, or the initial value if no adjustments have yet been made. For example, the new color may be adjusted by the following equation:

$$\text{NewColor}(V_i) = \text{NewColor}(V_i) + G(v-t, \sigma_g^2) \times \text{Color}(V_t) \quad (2)$$

where $V_t$ is the neighboring vertex, and v–t is the geometric distance between vertices i and t.

Next, each unvisited vertex that is a neighbor of vertex t is pushed at 422 onto the queue. If at 424 a sufficient number of matches (valid neighbors) have not yet been found (e.g., at least 60% of all visited neighboring vertices), and there are still unvisited vertices in the queue, then the variable i is incremented by one at 426, and the algorithm 400 repeats at 404. Otherwise, if at 424 a sufficient number of matches (valid neighbors) have been found (e.g., at least 60% of all visited neighboring vertices based on the values stored in the variables), the color of the given vertex is replaced at 428 by the adjusted new color, and the algorithm 400 repeats at 404 for each remaining vertex in the queue, if any.

Figures 5A, 5B:
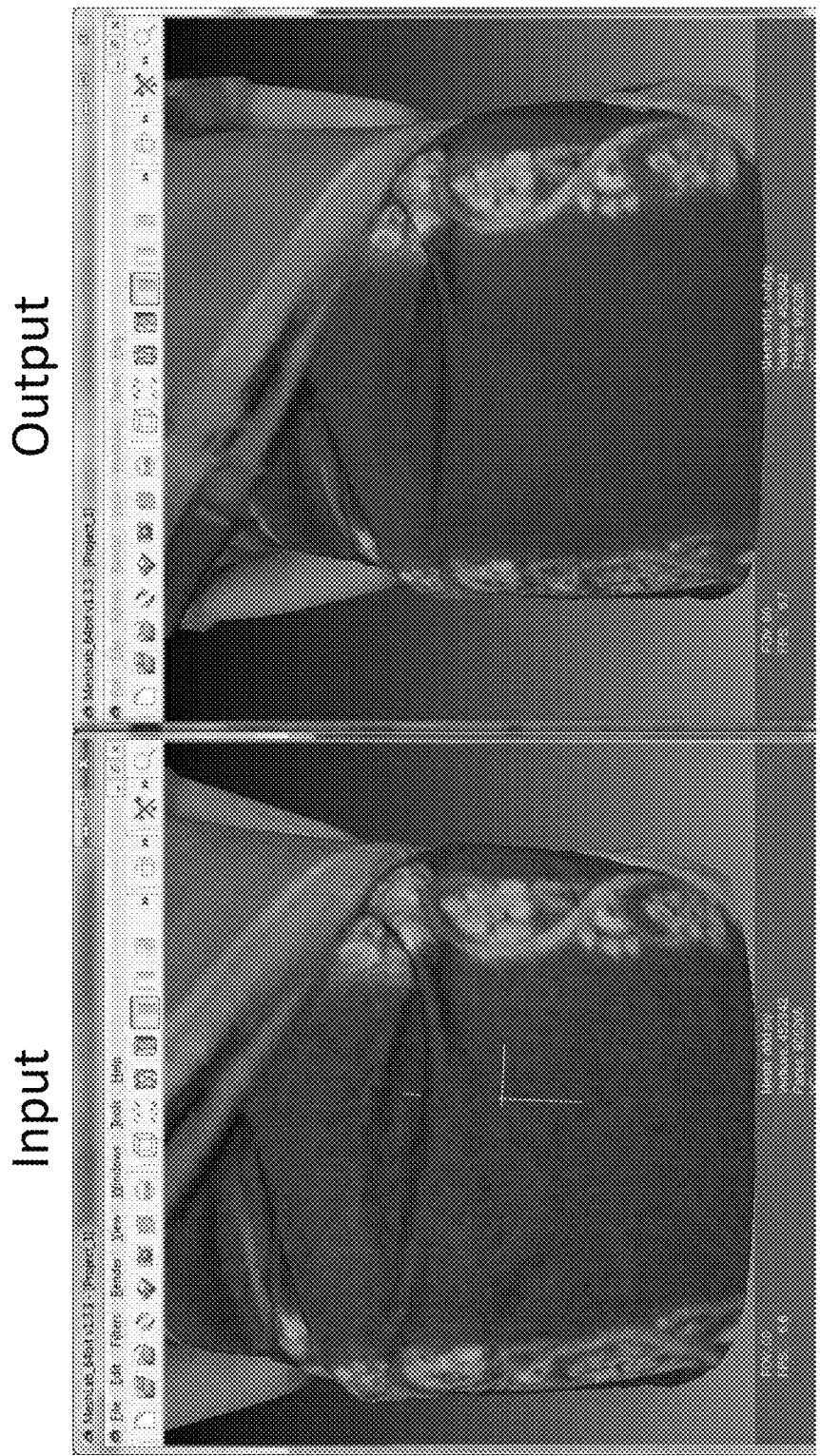
FIG. 5A is an example image containing 3D color information prior to noise reduction and color smoothing.
FIG. 5B is the example image of FIG. 5A after processing to reduce noise and smooth colors using a technique in accordance with an embodiment of the present disclosure.

FIG. 5A is an example image containing 3D color information prior to noise reduction and color smoothing. FIG. 5B is the example image of FIG. 5A after processing to reduce noise and smooth colors using a technique in accordance with an embodiment of the present disclosure. The results shown in FIG. 5B can be obtained automatically and without manual intervention, in contrast to prior techniques.

Example Pseudocode

In accordance with an embodiment, one example noise reduction and color smoothing process can be implemented using the following pseudocode:

```
for each v in S // for each vertex in the set of vertices in 3D mesh model
{
    Q = [v] // initialize queue
    newColor = ( G(0,σg²)*r, G(0,σg²)*g, G(0,σg²)*b )
    // C[v]= (r, g, b) and G(r,σg²)is the Gaussian function computed
    // at 'r' with variance σg²
    visited = [ ] // empty visited map
    visitCount = 0, matchCount = 0
    while (!Q.empty( )) { // do while the queue is not empty
        t = Q.pop( ) // extract first element from the queue
        visited[t] = TRUE // mark vertex 't' as visited
        ++visitCount // increment the visit count
        // if vertex 't' is geometrically close to vertex 'v'
        // then use color of vertex 't' for blurring edge at vertex 'v'
        if ( |v − t| <= σg ) {
            // If the difference between the normals and colors are
            // acceptable, then proceed using neighbors
            if ( C[v] − C[t] <= τc && cos⁻¹ ( N[v].N[t] ) <= 0.1 ) {
                ++matchCount // increment the match count
                // add colors weighted by the Gaussian function
                newColor = newColor + G(v-t, σg²) * C[t]
                // visit neighbors
                D = A[t] // A[i] is list of vertices neighboring
                        // vertex 'i'
                for each d in D {
                    if (!visited[d]) then Q.push(d)
                }
            }
        }
    }
}
```

```
    // If at least 60% of vertex visits are matches
    // then assign new color to vertex
    if (matchCount >= 0.6 * visitCount) {
        C'[v] = newColor
    }
    // else retain the original color of the vertex
    else {
        C'[v] = C[v]
    }
}
```

Example Computing Device

Figure 6:
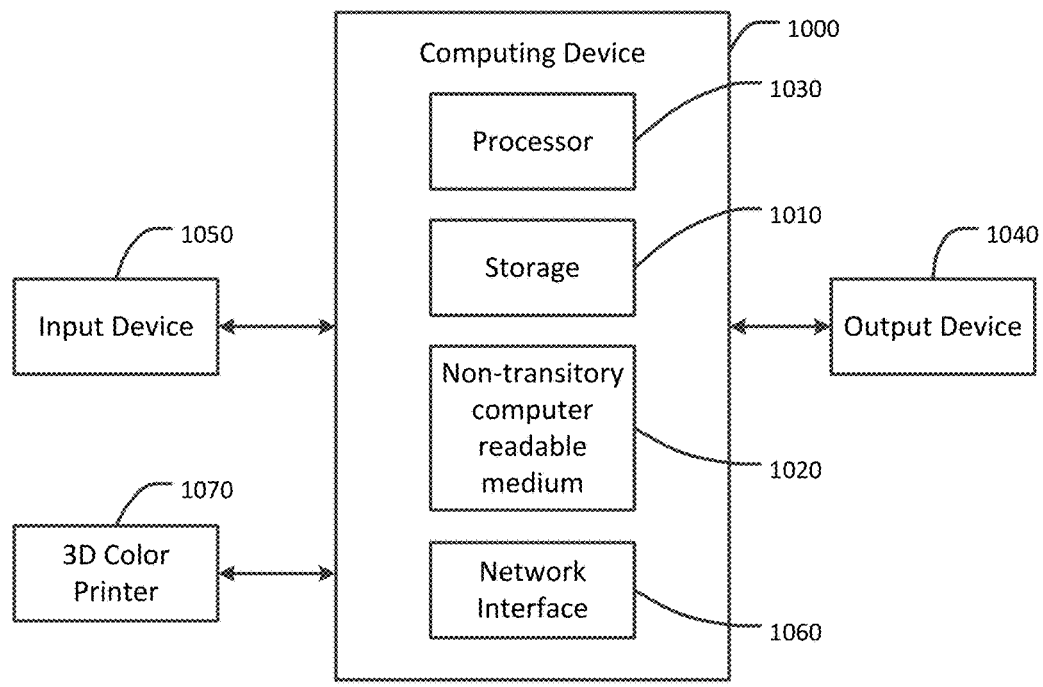
FIG. 6 is a block diagram representing an example computing device that may be used in accordance with an embodiment of the present disclosure.

FIG. 6 is a block diagram representing an example computing device 1000 that may be used to perform any of the techniques as variously described in this disclosure. For example, the computing device 110 and the noise reduction and color smoothing module 112 of FIG. 1, or any combination of these, may be implemented in the computing device 1000. The computing device 1000 may be any computer system, such as a workstation, desktop computer, server, laptop, handheld computer, tablet computer (e.g., the iPad™ tablet computer), mobile computing or communication device (e.g., the iPhone™ mobile communication device, the Android™ mobile communication device, and the like), or other form of computing or telecommunications device that is capable of communication and that has sufficient processor power and memory capacity to perform the operations described in this disclosure. A distributed computational system may be provided comprising a plurality of such computing devices.

The computing device 1000 includes one or more storage devices 1010 and/or non-transitory computer-readable media 1020 having encoded thereon one or more computer-executable instructions or software for implementing techniques as variously described in this disclosure. The storage devices 1010 may include a computer system memory or random access memory, such as a durable disk storage (which may include any suitable optical or magnetic durable storage device, e.g., RAM, ROM, Flash, USB drive, or other semiconductor-based storage medium), a hard-drive, CD-ROM, or other computer readable media, for storing data and computer-readable instructions and/or software that implement various embodiments as taught in this disclosure. The storage device 1010 may include other types of memory as well, or combinations thereof. The storage device 1010 may be provided on the computing device 1000 or provided separately or remotely from the computing device 1000. The non-transitory computer-readable media 1020 may include, but are not limited to, one or more types of hardware memory, non-transitory tangible media (for example, one or more magnetic storage disks, one or more optical disks, one or more USB flash drives), and the like. The non-transitory computer-readable media 1020 included in the computing device 1000 may store computer-readable and computer-executable instructions or software for implementing various embodiments. The computer-readable media 1020 may be provided on the computing device 1000 or provided separately or remotely from the computing device 1000.

The computing device 1000 also includes at least one processor 1030 for executing computer-readable and computer-executable instructions or software stored in the storage device 1010 and/or non-transitory computer-readable media 1020 and other programs for controlling system hardware. Virtualization may be employed in the computing device 1000 so that infrastructure and resources in the computing device 1000 may be shared dynamically. For example, a virtual machine may be provided to handle a process running on multiple processors so that the process appears to be using only one computing resource rather than multiple computing resources. Multiple virtual machines may also be used with one processor.

A user may interact with the computing device 1000 through an output device 1040, such as a screen or monitor, which may display one or more user interfaces provided in accordance with some embodiments. The output device 1040 may also display other aspects, elements and/or information or data associated with some embodiments. The computing device 1000 may include other I/O devices 1050 for receiving input from a user, for example, a keyboard, a joystick, a game controller, a pointing device (e.g., a mouse, a user's finger interfacing directly with a display device, etc.), or any suitable user interface. The computing device 1000 may include other suitable conventional I/O peripherals, such as a 3D color printer 1070 (e.g., the 3D color printer 120 of FIG. 1). The computing device 1000 can include and/or be operatively coupled to various suitable devices for performing one or more of the functions as variously described in this disclosure.

The computing device 1000 may run any operating system, such as any of the versions of Microsoft® Windows® operating systems, the different releases of the Unix and Linux operating systems, any version of the MacOS® for Macintosh computers, any embedded operating system, any real-time operating system, any open source operating system, any proprietary operating system, any operating systems for mobile computing devices, or any other operating system capable of running on the computing device 1000 and performing the operations described in this disclosure. In an embodiment, the operating system may be run on one or more cloud machine instances.

In other embodiments, the functional components/modules may be implemented with hardware, such as gate level logic (e.g., FPGA) or a purpose-built semiconductor (e.g., ASIC). Still other embodiments may be implemented with a microcontroller having a number of input/output ports for receiving and outputting data, and a number of embedded routines for carrying out the functionality described in this disclosure. In a more general sense, any suitable combination of hardware, software, and firmware can be used, as will be apparent.

As will be appreciated in light of this disclosure, the various modules and components of the system can be implemented in software, such as a set of instructions (e.g., HTML, XML, C, C++, object-oriented C, JavaScript, Java, BASIC, etc.) encoded on any computer readable medium or computer program product (e.g., hard drive, server, disc, or other suitable non-transient memory or set of memories), that when executed by one or more processors, cause the various methodologies provided in this disclosure to be carried out. It will be appreciated that, in some embodiments, various functions performed by the user computing system, as described in this disclosure, can be performed by similar processors and/or databases in different configurations and arrangements, and that the depicted embodiments are not intended to be limiting. Various components of this example embodiment, including the computing device 1000, can be integrated into, for example, one or more desktop or laptop computers, workstations, tablets, smart phones, game consoles, set-top boxes, or other such computing devices. Other componentry and modules typical of a computing system, such as processors (e.g., central processing unit and co-processor, graphics processor, etc.), input devices (e.g., keyboard, mouse, touch pad, touch screen, etc.), and operating system, are not shown but will be readily apparent.

Numerous embodiments will be apparent in light of the present disclosure, and features described in this disclosure can be combined in any number of configurations. One example embodiment provides a system including a storage having at least one memory, and one or more processors each operatively coupled to the storage. The one or more processors are configured to carry out a process including receiving input data representing a three-dimensional (3D) mesh model having a plurality of vertices, each vertex being associated with color information; computing new color information as a Gaussian function of the color information for a given vertex; determining whether a color difference between the color information for the given vertex and the color information for a neighboring vertex is less than or equal to a first pre-defined threshold value; determining whether an angle between a surface normal associated with the given vertex and a surface normal associated with the neighboring vertex is less than or equal to a second pre-defined threshold value; adjusting the new color information by a Gaussian weighted factor of color information for neighboring vertex only where the color difference is less than or equal to the first pre-defined threshold and the angle is less than or equal to the second pre-defined threshold; repeating, for each of a plurality of neighboring vertices, the determining of the color difference, the determining of the angle, and the adjusting of the new color information; and replacing the color information for the given vertex with the adjusted new color information only where the new color information is adjusted for at least a pre-determined percentage of the neighboring vertices. In some cases, the process further includes determining a geometric distance between the given vertex and the neighboring vertex, where the adjusting of the new color information is performed only where the geometric distance is less than or equal to a pre-defined maximum radius of traversal. In some cases, the process further comprises repeating the computing of the new color information, the determining of the color difference, the determining of the angle, the adjusting of the new color information, the repeating of the determining of the color difference, and the replacing of the color information for each of the plurality of vertices in the 3D mesh model. In some cases, the new color is computed as: $\text{NewColor}(V_i) = G(0,\sigma_g^2) \times r, G(0,\sigma_g^2) \times g, G(0,\sigma_g^2) \times b$, where $V_i$ is the given vector, where r, g, and b represent red, green and blue, respectively, where G represents a Gaussian function, and where $\sigma_g$ represents a pre-defined maximum radius of traversal. In some such cases, the new color is adjusted as $\text{NewColor}(V_i) = \text{NewColor}(V_i) + G(v-t, \sigma_g^2) \times \text{Color}(V_t)$, where $V_t$ is the neighboring vector, where v and t are the geometric coordinates of the given vector and the neighboring vector, respectively, and where $\text{Color}(V_t)$ is the color of the neighboring vertex. In some cases, the first pre-defined threshold is a value between zero and one, and wherein the second pre-defined threshold is a function of the inverse cosine of the angle. In some cases, the pre-determined percentage of the neighboring vertices is approximately 60%. Another embodiment provides a non-transient computer-readable medium or computer program product having instructions encoded thereon that when executed by one or more processors cause the processor to perform one or more of the functions defined in the present disclosure, such as the methodologies variously described in this paragraph. In some cases, some or all of the functions variously described in this paragraph can be performed in any order and at any time by one or more different processors.

The foregoing description and drawings of various embodiments are presented by way of example only. These examples are not intended to be exhaustive or to limit the invention to the precise forms disclosed. Alterations, modifications, and variations will be apparent in light of this disclosure and are intended to be within the scope of the invention as set forth in the claims.

What is claimed is:

1. A computer-implemented digital image processing method comprising:
   receiving, by a computer processor, input data representing a three-dimensional (3D) mesh model having a plurality of vertices, each vertex being associated with color information;
   computing, by the computer processor, new color information as a Gaussian function of the color information for a given vertex;
   determining, by the computer processor, whether a color difference between the color information for the given vertex and the color information for a neighboring vertex is less than or equal to a first pre-defined threshold value;
   determining, by the computer processor, whether an angle between a surface normal associated with the given vertex and a surface normal associated with the neighboring vertex is less than or equal to a second pre-defined threshold value;
   adjusting, by the computer processor, the new color information by a Gaussian weighted factor of color information for neighboring vertex only where the color difference is less than or equal to the first pre-defined threshold and the angle is less than or equal to the second pre-defined threshold;
   repeating, for each of a plurality of neighboring vertices, the determining of the color difference, the determining of the angle, and the adjusting of the new color information;
   replacing, by the computer processor, the color information for the given vertex with the adjusted new color information only where the new color information is adjusted for at least a pre-determined percentage of the neighboring vertices to produce a color smoothed 3D mesh model; and
   causing, by the computer processor, a3D printer to produce a 3D printed object using the color smoothed 3D mesh model.

2. The method of claim 1, further comprising determining, by the computer processor, a geometric distance between the given vertex and the neighboring vertex, wherein the adjusting of the new color information is performed only where the geometric distance is less than or equal to a pre-defined maximum radius of traversal.

3. The method of claim 1, further comprising repeating the computing of the new color information, the determining of the color difference, the determining of the angle, the adjusting of the new color information, the repeating of the determining of the color difference, and the replacing of the color information for each of the plurality of vertices in the 3D mesh model.

4. The method of claim 1, wherein the new color is computed as:

$$\text{NewColor}(V_i) = G(0,\sigma_g^2) \times r, G(0,\sigma_g^2) \times g, G(0,\sigma_g^2) \times b$$

wherein $V_i$ is the given vector, wherein r, g, and b represent red, green and blue, respectively, wherein G represents a Gaussian function, and wherein $\sigma_g$ represents a pre-defined maximum radius of traversal.

5. The method of claim 4, wherein the new color is adjusted as:

$$\text{NewColor}(V_i) = \text{NewColor}(V_i) + G(v-t, \sigma_g^2) \times \text{Color}(V_t)$$

wherein $V_t$ is the neighboring vector, wherein v and t are the geometric coordinates of the given vector and the neighboring vector, respectively, and wherein Color $(V_t)$ is the color of the neighboring vertex.

6. The method of claim 1, wherein the first pre-defined threshold is a value between zero and one, and wherein the second pre-defined threshold is a function of the inverse cosine of the angle.

7. The method of claim 1, wherein the pre-determined percentage of the neighboring vertices is approximately 60%.

8. A system comprising:
a storage; and
one or more processors operatively coupled to the storage, the one or more processors configured to execute instructions stored in the storage that when executed cause the one or more processors to carry out a process comprising:
  receiving input data representing a three-dimensional (3D) mesh model having a plurality of vertices, each vertex being associated with color information;
  computing new color information as a Gaussian function of the color information for a given vertex;
  determining whether a color difference between the color information for the given vertex and the color information for a neighboring vertex is less than or equal to a first pre-defined threshold value;
  determining whether an angle between a surface normal associated with the given vertex and a surface normal associated with the neighboring vertex is less than or equal to a second pre-defined threshold value;
  adjusting the new color information by a Gaussian weighted factor of color information for neighboring vertex only where the color difference is less than or equal to the first pre-defined threshold and the angle is less than or equal to the second pre-defined threshold;
  repeating, for each of a plurality of neighboring vertices, the determining of the color difference, the determining of the angle, and the adjusting of the new color information;
  replacing the color information for the given vertex with the adjusted new color information only where the new color information is adjusted for at least a pre-determined percentage of the neighboring vertices to produce a color smoothed 3D mesh model; and
  causing a 3D printer to produce a 3D printed object using the color smoothed 3D mesh model.

9. The system of claim 8, wherein the process further comprises determining a geometric distance between the given vertex and the neighboring vertex, wherein the adjusting of the new color information is performed only where the geometric distance is less than or equal to a pre-defined maximum radius of traversal.

10. The system of claim 8, wherein the process further comprises repeating the computing of the new color information, the determining of the color difference, the determining of the angle, the adjusting of the new color information, the repeating of the determining of the color difference, and the replacing of the color information for each of the plurality of vertices in the 3D mesh model.

11. The system of claim 8, wherein the new color is computed as:

$$\text{NewColor}(V_i) = G(0, \sigma_g^2) \times r, G(0, \sigma_g^2) \times g, G(0, \sigma_g^2) \times b$$

wherein $V_i$ is the given vector, wherein r, g, and b represent red, green and blue, respectively, wherein G represents a Gaussian function, and wherein $\sigma_g$ represents a pre-defined maximum radius of traversal.

12. The system of claim 11, wherein the new color is adjusted as:

$$\text{NewColor}(V_i) = \text{NewColor}(V_i) + G(v-t, \sigma_g^2) \times \text{Color}(V_t)$$

wherein $V_t$ is the neighboring vector, wherein v and t are the geometric coordinates of the given vector and the neighboring vector, respectively, and wherein Color $(V_t)$ is the color of the neighboring vertex.

13. The system of claim 8, wherein the first pre-defined threshold is a value between zero and one, and wherein the second pre-defined threshold is a function of the inverse cosine of the angle.

14. The system of claim 8, wherein the pre-determined percentage of the neighboring vertices is approximately 60%.

15. A computer program product including one or more non-transitory machine-readable media having instructions encoded thereon that when executed by one or more processors cause a process to be carried out, the process comprising:
  receiving input data representing a three-dimensional (3D) mesh model having a plurality of vertices, each vertex being associated with color information;
  computing new color information as a Gaussian function of the color information for a given vertex;
  determining whether a color difference between the color information for the given vertex and the color information for a neighboring vertex is less than or equal to a first pre-defined threshold value;
  determining whether an angle between a surface normal associated with the given vertex and a surface normal associated with the neighboring vertex is less than or equal to a second pre-defined threshold value;
  adjusting the new color information by a Gaussian weighted factor of color information for neighboring vertex only where the color difference is less than or equal to the first pre-defined threshold and the angle is less than or equal to the second pre-defined threshold;
  repeating, for each of a plurality of neighboring vertices, the determining of the color difference, the determining of the angle, and the adjusting of the new color information;
  replacing the color information for the given vertex with the adjusted new color information only where the new color information is adjusted for at least a pre-determined percentage of the neighboring vertices to produce a color smoothed 3D mesh model; and
  causing a 3D printer to produce a 3D printed object using the color smoothed 3D mesh model.

16. The computer program product of claim 15, wherein the process further comprises determining a geometric distance between the given vertex and the neighboring vertex, wherein the adjusting of the new color information is performed only where the geometric distance is less than or equal to a pre-defined maximum radius of traversal.

17. The computer program product of claim 15, wherein the process further comprises repeating the computing of the new color information, the determining of the color difference, the determining of the angle, the adjusting of the new color information, the repeating of the determining of the color difference, and the replacing of the color information for each of the plurality of vertices in the 3D mesh model.

18. The computer program product of claim 15, wherein the new color is computed as:

$$\text{NewColor}(V_i) = G(0, \sigma_g^2) \times r, \ G(0, \sigma_g^2) \times g, \ G(0, \sigma_g^2) \times b$$

wherein $V_i$ is the given vector, wherein r, g, and b represent red, green and blue, respectively, wherein G represents a Gaussian function, and wherein $\sigma_g$ represents a pre-defined maximum radius of traversal.

19. The computer program product of claim 18, wherein the new color is adjusted as:

$$\text{NewColor}(V_i) = \text{NewColor}(V_i) + G(v-t, \sigma_g^2) \times \text{Color}(V_t)$$

wherein $V_t$ is the neighboring vector, wherein v and t are the geometric coordinates of the given vector and the neighboring vector, respectively, and wherein Color ($V_t$) is the color of the neighboring vertex.

20. The computer program product of claim 15, wherein the first pre-defined threshold is a value between zero and one, and wherein the second pre-defined threshold is a function of the inverse cosine of the angle.

\* \* \* \* \*